United States Patent
Yang et al.

(10) Patent No.: US 7,933,509 B2
(45) Date of Patent: Apr. 26, 2011

(54) DEVICE AND METHOD FOR REDUCING OPTICAL BLURRING

(75) Inventors: Sen Yang, Palatine, IL (US); Kevin W. Johnson, Mundelein, IL (US); Dongxue Wang, Palatine, IL (US); Chien-Hui Wen, Vernon Hills, IL (US); Zhiming Zhuang, Kildeer, IL (US)

(73) Assignee: Motorola, Inc., Schaumburg, IL (US)

( * ) Notice: Subject to any disclaimer, the term of this patent is extended or adjusted under 35 U.S.C. 154(b) by 228 days.

(21) Appl. No.: 11/967,598

(22) Filed: Dec. 31, 2007

(65) Prior Publication Data

US 2009/0169192 A1 Jul. 2, 2009

(51) Int. Cl.
*G03B 17/00* (2006.01)
*H04N 5/228* (2006.01)

(52) U.S. Cl. .................................. 396/55; 348/208.99
(58) Field of Classification Search .................. 395/55; 348/208.99, 208.1, 208.2, 208.4, 208.5, 208.6, 348/208.7, 208.11
See application file for complete search history.

(56) References Cited

U.S. PATENT DOCUMENTS

| | | | |
|---|---|---|---|
| 5,097,352 A | 3/1992 | Takahashi et al. | |
| 5,150,234 A | 9/1992 | Takahashi et al. | |
| 5,359,444 A | 10/1994 | Piosenka et al. | |
| 5,815,233 A | 9/1998 | Morokawa et al. | |
| 6,987,529 B1 * | 1/2006 | Ito | 348/208.2 |
| 7,025,468 B2 | 4/2006 | Nishioka et al. | |
| 7,580,619 B2 * | 8/2009 | Ootsuka et al. | 396/55 |
| 2002/0181126 A1 | 12/2002 | Nishioka | |
| 2006/0164732 A1 | 7/2006 | Lee et al. | |
| 2007/0216851 A1 | 9/2007 | Matsumoto | |
| 2009/0059101 A1 | 3/2009 | Wang et al. | |

FOREIGN PATENT DOCUMENTS

| | | |
|---|---|---|
| JP | 2001249282 A | 9/2001 |
| JP | 2001272646 A | 10/2001 |
| JP | 200717934 A | 1/2007 |
| WO | 2005081038 A1 | 9/2005 |

OTHER PUBLICATIONS

Optical Phased Array Technology, Proc. IEEE, vol. 84, p. 268 (1996); publication by Paul F. McManamon.
PCT "Notification of Transmittal of the International Search Report and the Written Opinion of the International Searching Authority, or the Declaration", Jan. 12, 2009, pp. 1-10, PCT/US2008/073972, Korean Intellectual Property Office.
United States Patent Office "Office Action Summary", Apr. 15, 2010, pp. 1-40, U.S. Appl. No. 11/846,061, Alexandria, Virginia.
Li, et al. "Switchable Electro-Optic Diffractice Lens with High Efficiency for Ophtalmic Applications", Apr. 18, 2006, pp. 6100-6104, vol. 103, The National Academy of Sciences of the USA.

* cited by examiner

*Primary Examiner* — Rodney E Fuller
(74) *Attorney, Agent, or Firm* — Mayback & Hoffman, P.A.; Gregory L. Mayback; Rebecca A. Tie (57) ABSTRACT

A camera-movement compensation device includes a first liquid-crystal cell with a pair of parallel transparent plates and a first voltage source coupled to the first liquid-crystal cell and able to apply and alter a first voltage gradient across the plates of the first liquid-crystal cell. The device also includes a second liquid-crystal cell having a pair of parallel transparent plates and disposed so that each of the plates of the second liquid-crystal cell is parallel to the plates of the first liquid-crystal cell and in light communication with at least one wave of light passing through the plates of the first liquid-crystal cell, a second voltage source coupled to the second liquid-crystal cell and able to apply and alter a second voltage gradient across the surfaces of the second liquid-crystal cell, and a movement detector coupled to the voltage sources to alter the slope of the voltage gradients in proportion to a movement.

14 Claims, 11 Drawing Sheets

⊙ INPUT BEAM POLARIZATION DIRECTION

WITH VOLTAGE GRADIENT

DEVICE AND METHOD FOR REDUCING OPTICAL BLURRING

FIELD OF THE INVENTION

This invention relates in general to digital photography, and more particularly, to reducing image blurring with electronically controlled liquid-crystal optics.

BACKGROUND OF THE INVENTION

Cellular telephone manufacturers are forever striving to decrease the size of their phones while, at the same time, striving to increase the number and complexity of the device's features. One example of such a feature is a digital camera integrated into the phone, which has become standard in newer phones. Not only has this feature become standard, with each new generation of phone, customers expect the resolution, speed, clarity, and other aspects of the camera to increase. Similarly, with each new generation, the phone's display screen increases in size and/or resolution. This increase in display capability works against the camera's performance, as it is becoming easier for a user to observe defects in the image captured by the camera.

With digital cameras, just as with conventional mechanical/film cameras, the amount of light that reaches the sensor is controlled with a shutter. The shutter opens to allow light passing through the aperture to reach the image sensor. The amount of time that the shutter is open controls the amount of light that the image sensor receives. Unlike film, the light sensor in a digital camera can be reset electronically, so, digital cameras have a digital shutter rather than a mechanical shutter. Therefore, when a camera captures an image, this image represents the scene over a period of time (exposure time).

If the camera, moves during the exposure time, the sensor will receive what is referred to as a "blurred" image—an image without well-defined edges and devoid of detail. Blurring is a natural result of a shaky hand, taking a picture while in a moving vehicle, taking a picture while walking, or many other causes.

To improve the image quality and compensate for camera shaking, conventional camera design requires mechanical movement of a lens or mirror to adjust an optical path length (OPL). Because prior-art lenses, mirrors, and the apparatuses to move them are too large for a cellular phone, prior art methods of reducing blur not practical.

Therefore, a need exists to overcome the problems associated with the prior art as discussed above.

SUMMARY OF THE INVENTION

A camera-movement compensation device, in accordance with an embodiment of the present invention includes a first liquid-crystal cell having a pair of parallel transparent plates and a first voltage source coupled to the first liquid-crystal cell and able to apply and alter a first voltage gradient across the plates of the first liquid-crystal cell. The device also includes a second liquid-crystal cell having a pair of parallel transparent plates and disposed so that each of the plates of the second liquid-crystal cell is parallel to the plates of the first liquid-crystal cell and in light communication with at least one wave of light passing through the plates of the first liquid-crystal cell, a second voltage source coupled to the second liquid-crystal cell and able to apply and alter a second voltage gradient across the surfaces of the second liquid-crystal cell, and a movement and orientation defector communicatively coupled to the first and second voltage sources, wherein the first voltage source alters a slope of the first voltage gradient in proportion to a movement sensed by the detector and the second voltage source alters a slope of the second voltage gradient in proportion to a movement sensed by the detector.

In accordance with an additional feature of the present invention, the device includes a low-voltage state of the first voltage source, and a low-voltage state of the second voltage source, wherein when the first and second voltage sources are in the low-voltage state, a liquid crystal director of the first liquid-crystal cell and a liquid crystal director of the second liquid-crystal cell are both either parallel or perpendicular to the plates of their respective first and second liquid-crystal cells.

In another embodiment, in accordance with the present invention, the liquid crystal director of the first liquid crystal cell is parallel to the plates of the first liquid crystal cell, and the liquid crystal director of the second liquid crystal cell is perpendicular to the plates of the second liquid crystal cell, or vice versa.

In accordance with a further feature of the present invention, the rubbing direction of the first liquid-crystal cell is orthogonal to the rubbing direction of the second liquid-crystal cell.

In accordance with a yet another feature of the present invention, the first voltage gradient is parallel to the second voltage gradient.

In accordance with a yet another feature, a slope of the first voltage gradient and a slope of the second voltage gradient are constants such that a resulting variation in a refractive index across each of the liquid-crystal cells is linear.

In accordance with a further feature, the present invention includes a first mirror parallel with and adjacent to the first and second liquid-crystal cells for reflecting light rays passing through the first and second liquid-crystal cells into the first and second liquid-crystal cells.

The present invention, according to another embodiment, includes a method for compensating for a camera movement by detecting a movement of a camera and compensating for the detected movement by applying a first voltage gradient to a first liquid-crystal cell and/or a second voltage gradient to a second liquid-crystal cell, where a slope of the applied gradient is in proportion to the detected movement.

In accordance with a further feature of the present invention, the first liquid-crystal cell includes a first plurality of liquid-crystal molecules sandwiched between a first pair of parallel transparent plates, the second liquid-crystal cell includes a second plurality of liquid-crystal molecules sandwiched between a second pair of parallel transparent plates, and applying the at least one voltage gradient changes an orientation of a liquid-crystal director of at least one of the first and second one of the liquid-crystal cell with respect to the other of the first and second liquid-crystal cells dependent upon the detected movement.

In accordance with a yet another feature of the present invention, the applying the at least one voltage gradient changes at least one of the first and second plurality of liquid-crystal molecules from an initial state where a liquid-crystal director of the at least one of the first and second one of the liquid-crystal cells is one of parallel and perpendicular to the plates of the at least one of the first and second liquid-crystal cells.

Other features that are considered as characteristic for the invention are set forth in the appended claims.

Although the invention is illustrated and described herein as embodied in a device and method for reducing optical blurring, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Embodiments herein can be implemented in a wide variety of ways using a variety of technologies that enable not only the reduction of blur effects within a camera, but also the means for manufacture of an anti-blur camera. These cameras will generally have no moving mechanical parts and can enable blur reduction by taking advantage of voltage-dependent birefringence of liquid-crystal display structures.

Figure 1:
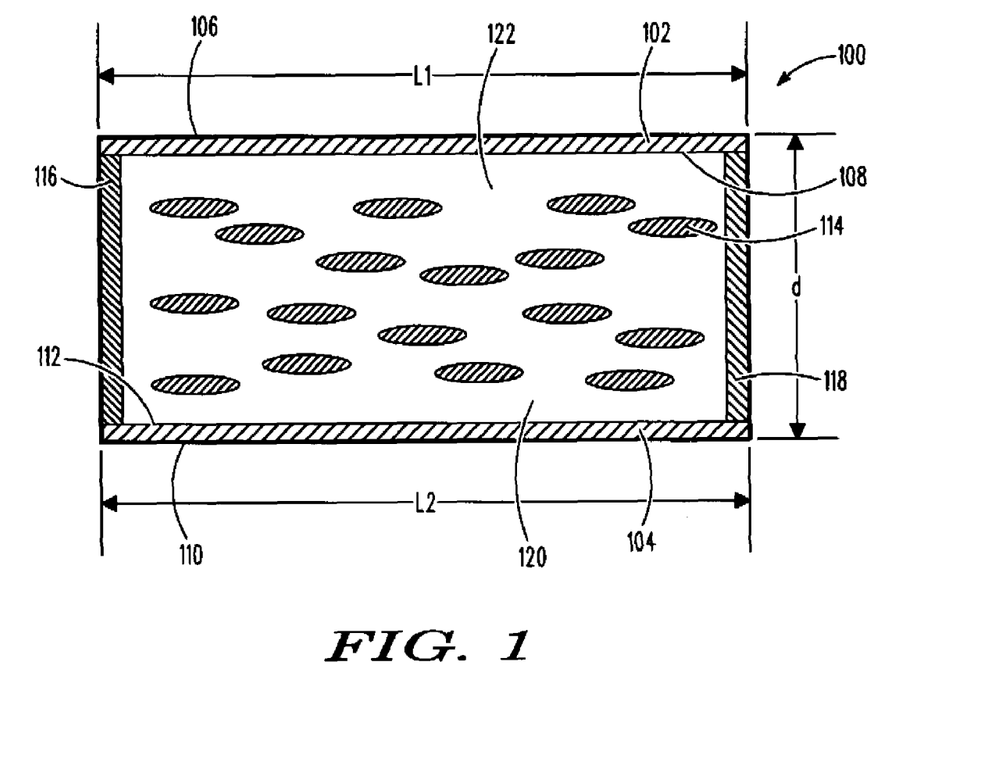
FIG. 1 is a cross-section view of a liquid-crystal cell with liquid-crystal molecules aligned horizontally in liquid-crystal cell 100, according to an exemplary embodiment of the present invention.

The present invention provides a novel and efficient virtually instant correction for camera movement. FIG. 1 shows a first embodiment of liquid-crystal cell 100, which includes a pair of at least partially transparent plates 102 and 104 spaced apart from one another and aligned in a parallel configuration. More specifically, the first plate 102 has an exterior surface 108 and an interior surface 106. The interior 106 and exterior 108 surfaces are substantially flat surfaces and are substantially parallel to each other, thereby providing a substantially uniform thickness across a length L1 of the first plate 102. Similarly, the second plate 104 has and exterior surface 110 and an interior surface 112. The interior 112 and exterior 110 surfaces are substantially flat surfaces and are substantially parallel to each other, thereby providing a substantially uniform thickness across a length L2 of the second plate 104. In one embodiment, the lengths L1 and L2 are substantially equal.

The first plate 102 and the second plate 104 are separated by a distance d. In between the plates 102, 104 is a number of liquid crystals 114. The liquid crystals 114 are contained between the two plates 102, 104 by end caps 116 and 118. The liquid crystals 114 are further contained by an upper cap 120 and a lower cap 122. The upper cap 120 covers the upper edges of the plates 102 and 104. However, the view of FIG. 1 is looking down into the upper edges of the liquid-crystal cell and the upper cap 120 is shown as being transparent, which, in practice, may not always be the case. The lower edges of the plates 102, 104 are covered with a lower cap 122, which cannot be seen in the view of FIG. 1.

Liquid crystal molecules 114 have a preferred alignment direction, which can be described by a unit vector, and called its liquid-crystal "director." In one embodiment of the present invention, a normal orientation of the liquid-crystal director is substantially parallel to the two plates 102 and 104 shown in FIG. 1. This normal orientation (parallel to the two plates 102 and 104) is due to an alignment measure taken to ensure the liquid crystals 114 will have the resting direction as shown in FIG. 1. Alignment measures for liquid crystals are well-known in the art and can include use of polyimides, "rubbing" the interior surfaces 106 and 112 of the plates 102 and 104, applying an electrical field, static charge, and others.

Figure 2:
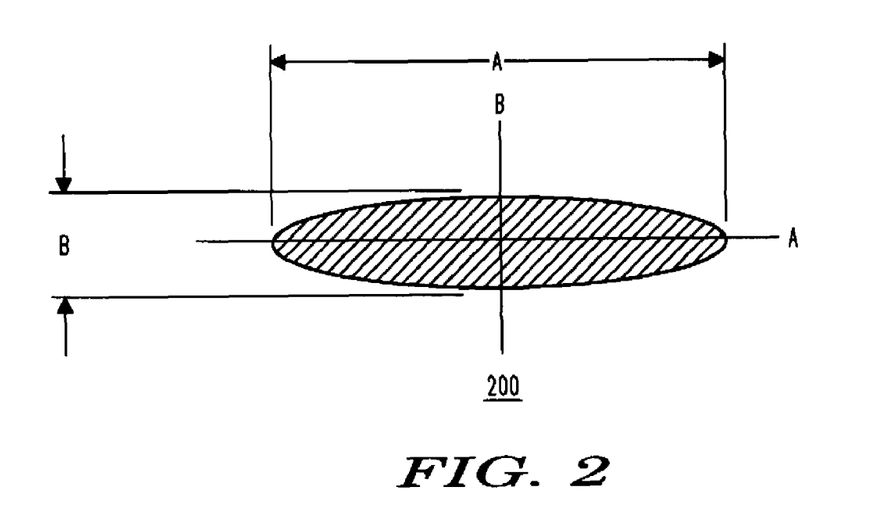
FIG. 2 is a plan view of a single liquid-crystal molecule, according to an exemplary embodiment of the present invention.

FIG. 2 shows a single liquid crystal 200 that is representative of each of the liquid crystals 114. The liquid crystal 200 has a first dimension A along a first axis A and a second dimension B along a second axis B. The first dimension A is longer than the second dimension B, and axis A is usually known as the long molecular axis.

Figure 3:
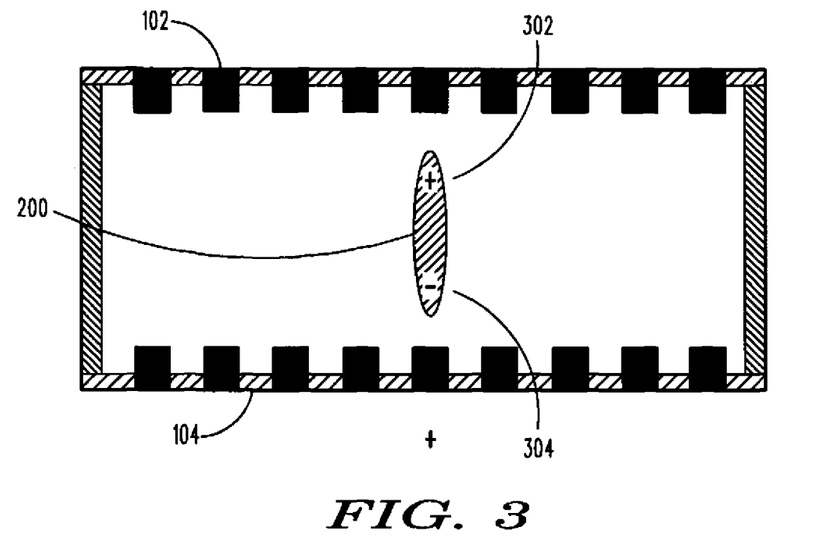
FIG. 3 is an illustration of a liquid-crystal molecule's reaction to an applied voltage, according to an exemplary embodiment of the present invention.

FIG. 3 shows the effect an applied voltage has on each liquid-crystal molecule 200. According to an embodiment of the invention, in an uncharged state, the liquid-crystal molecule 200 remains in its resting position, where the axis A is parallel to the plates 102 and 104, as shown in FIG. 2. However, once a charge is applied, i.e., an electric potential is applied across the plates 102 and 104, the liquid-crystal molecule 200 is driven and its axis A is perpendicular to the plates 102 and 104, as shown in FIG. 3.

FIG. 3 shows the liquid-crystal molecule 200 between the two plates 102 and 104. At voltage ON state, the first plate 102 has a negative charge applied and the second plate 104 has a positive charge applied. The liquid-crystal molecule 200, due to the charges applied to the plates 102 and 104, is driven. In its ON state, the liquid-crystal molecule 200 has a partially positive end 302 and a partially negative end 304. An attraction between the positive end 302 of the liquid crystal 200 and the negatively charged plate 102 and an equal attraction between the negative end 304 of the liquid crystal 200 and the positively charged plate 104 causes the liquid crystal 200 to leave its naturally aligned position, as shown in FIGS. 1 and 2, and rotate into a position similar to that shown in FIG. 3.

Throughout the charging and rotation, the liquid crystal retains its natural tendency to align itself as shown in FIGS. 1 and 2. As a result, once the electrical potential placed between the walls 102 and 104 is removed, the liquid crystal will "spring" back to its initial alignment (FIGS. 1 and 2). The liquid crystal's natural tendency to return to the initial orientation allows the liquid crystal's degree of rotation to be electrically controlled. In other words, the liquid crystal 200 can be oriented to any angle between the parallel orientation of FIGS. 1 and 2 and the perpendicular orientation of FIG. 3. The larger the voltage differential between the first plate 102 and the second plate 104, the greater the angle of rotation on the liquid crystal 200.

Throughout the charging, and rotation, the liquid crystal retains its natural tendency to align itself as shown in FIG. 2. As a result, once the electrical potential placed between the walls 102 and 104 is removed, the liquid crystal will "spring" back to its initial alignment (FIG. 2). The liquid crystal's natural tendency to return to the initial orientation allows the liquid crystal's degree of rotation to be electrically controlled. In other words, the liquid crystal 200 can be oriented to any angle between the parallel orientation of FIG. 2 and the perpendicular orientation of FIG. 3. The larger the voltage differential between the first plate 102 and the second plate 104, the greater the angle of rotation on the liquid crystal 200.

Figure 4:
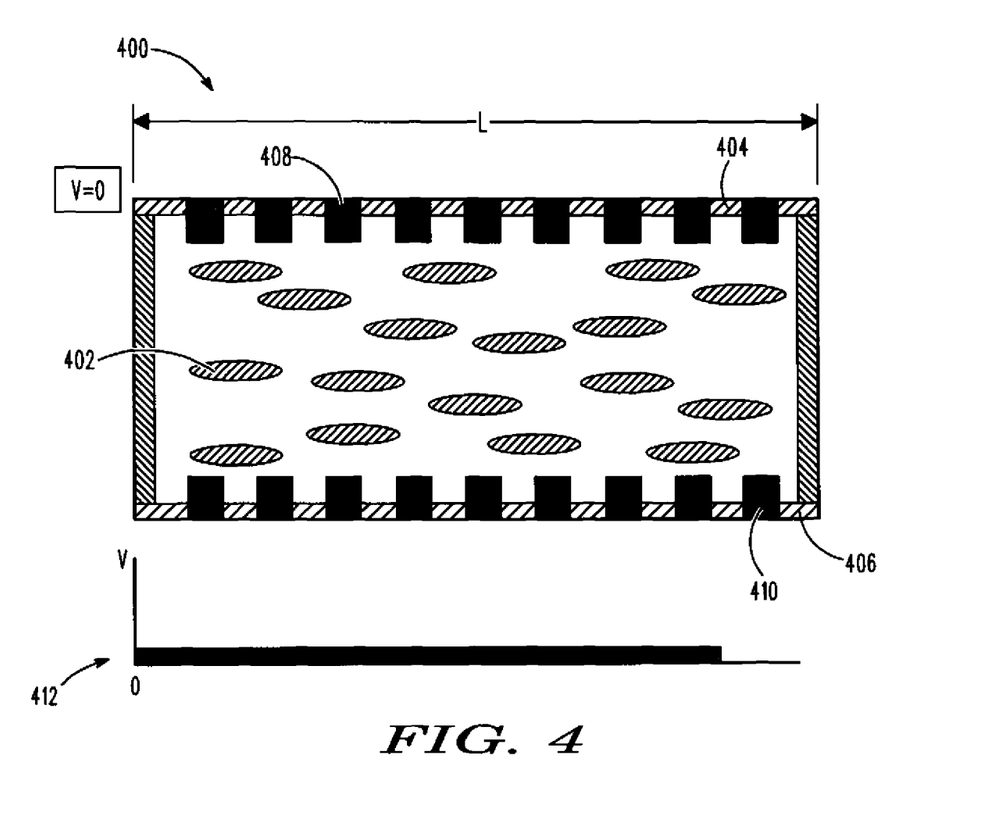
FIG. 4 is a cross-section view of a liquid-crystal cell with a plurality of liquid-crystal molecules provided between a first plate and a second plate.

FIG. 4 shows a liquid-crystal cell 400 with a plurality of liquid-crystal molecules 402 provided between a first plate 404 and a second plate 406. Each of the plates 404 and 406 have voltage applicators 408 and 410, respectively. The voltage applicators 408 and 410 represent any measure for applying a voltage to the plates 404 and 406. In addition to applying a uniform electrical potential across the plates 404 and 406, the voltage applicators 408 and 410 are able to apply a linear voltage gradient to the plates 404 and 406. When a voltage gradient is applied, a greater potential is present at a first location between the plates 404 and 406 than at a second location between the plates 404 and 406.

Directly below the cell 400 of FIG. 4 is a graph 412 showing the voltage potential applied to the cell 400 as being zero across the entire length L of the cell 400. With zero voltage applied, the liquid-crystal molecules 402 remain in their natural orientation, which is axially aligned with, or parallel to, the plates 404 and 406.

Figure 5:
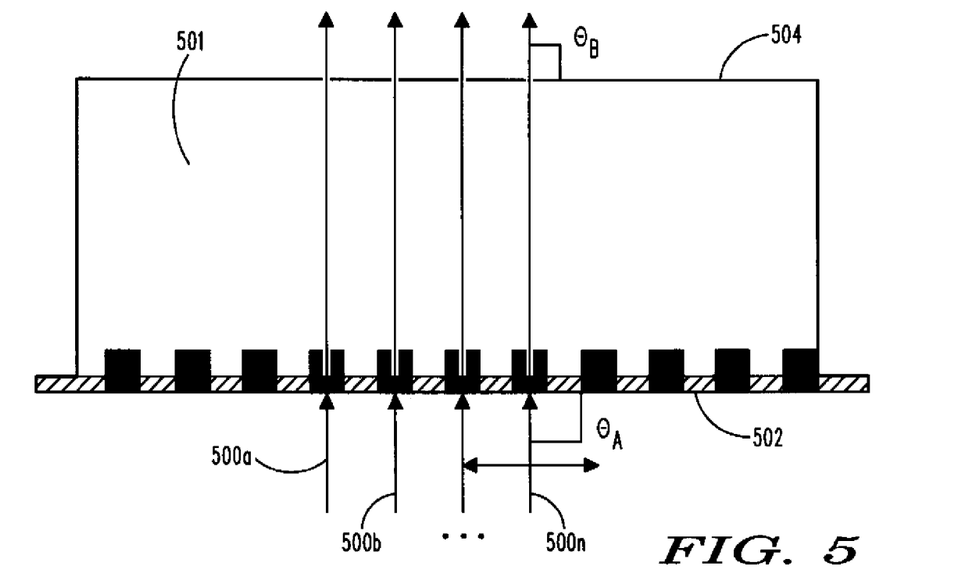
FIG. 5 is a cross-section view showing the effect the liquid-crystals have on a plurality of light rays that pass through the cell.

FIG. 5 shows the effect the liquid crystals have on a plurality of light rays 500a-n that pass through the cell 400. The cell 400 is represented as a block of transparent material 501, such as calcite crystals or boron nitride. The light rays 500a-n enter a first side 502 of the block 501 at a first angle $\Theta_A$, pass through the block 501, and exit the block 501 on a second side 504 at an angle $\Theta_B$, which is substantially equivalent to the first angle $\Theta_A$. The light passage is similar to light passing through an actual block of transparent material with parallel entry 502 and exit 504 faces.

Figure 6:
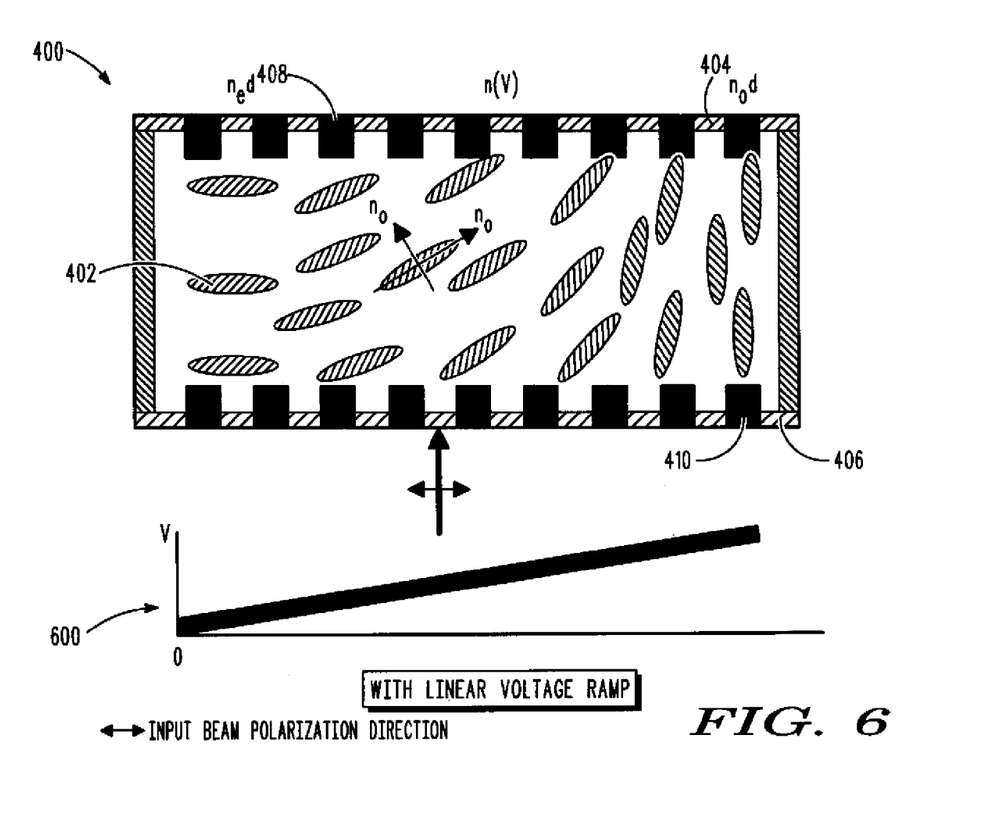
FIG. 6 is a cross-section view of voltage applicators applying a voltage gradient across a pair of liquid-crystal-cell plates, according to an exemplary embodiment of the present invention.

FIG. 6 shows the cell 400 with the voltage applicators 408 and 410 applying a voltage gradient across the plates 404 and 406. The graph 600 below the cell 400 shows the increasing voltage potential V applied across the length L of the cell 400. The left of the graph has a minimal voltage, shown as zero in the figure, and a maximum voltage at the right side of the figure. In one embodiment, the voltage applicators 408 and 410 are Indium Tin Oxide (ITO) traces or sheets having a controlled resistance and are known in the art. When the voltage is applied to one end, there is a smooth voltage drop gradient across the ITO sheet or trace.

The liquid-crystal molecules 402 respond to the applied voltages with a rotation that is proportional to the magnitude of the voltage V. More specifically, at the left side of the cell 400, where the voltage potential is at a minimum, as represented by the graph 600 below the cell, the liquid-crystal molecules 402 remain substantially in their originally aligned positions and axially (their A axis, as shown in FIG. 2) parallel with the plates 404 and 406. At the right side of the cell 400, where the voltage potential is at a maximum, as represented by the graph 600 below the cell, the liquid-crystal molecules 402 are turned from their original positions to a position substantially perpendicular to the plates 404 and 406. Between the left and right sides of the cell 400, the liquid-crystal molecules 402 are at varying angles between parallel and perpendicular to the plates 404 and 406, depending on the applied voltage V within the voltage gradient 600.

Advantageously, as is shown in the following figures, the applied voltage gradient 600 on the cell 400 causes an incidental light ray to exit the cell 400 at an angle $\Theta_B$ different from the incident angle $\Theta_A$.

Figure 7:
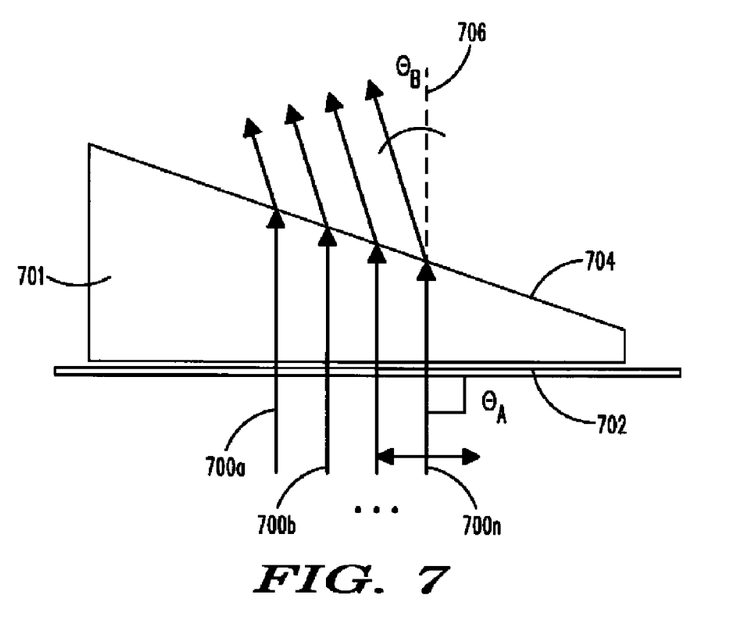
FIG. 7 is cross-section view of light rays entering an incidental face of the block physically equivalent to a liquid-crystal cell with applied voltage gradient, according to an exemplary embodiment of the present invention.

FIG. 7 shows a plurality of incidental light rays 700a-n entering an incidental face 702 of a block 701. The rays 700a-n travel through the block 701 and exit at an exit face 704. The exit face 704 is sloped and not parallel with the incidental face 702. The block 701 is representative of the effect the applied voltage gradient 600 has on the cell 400, which is the equivalent of creating a prism 701. As is known in the art, light entering a prism, with an exit face and entrance face that are not parallel, has a different exit angle than entrance angle. In FIG. 7, the light rays 700a-n enter the block 701 at an incident angle $\Theta_A$ and exit at an angle $\Theta_B$ that is different from the incident angle $\Theta_A$. The angles $\Theta_A$ and $\Theta_B$ are measured from a line 706 perpendicular to the incident face 702. Advantageously, the difference between the incident and exit angles $\Theta_A$ and $\Theta_B$, respectively, is directly controlled by the slope of the voltage gradient 600. As a result, the projection direction of light rays 700a-n can now be accurately adjusted and controlled.

As the light enters the cell 400, it undergoes an effect commonly referred to as "birefringence." Birefringence, or double refraction, is the decomposition of a ray of light into two rays (the ordinary ray "o" and the extraordinary ray "e," depending on the polarization of light) when it passes through certain types of material. This effect can occur only if the structure of the material is anisotropic (directionally dependent), as in the case of the cell 400 with the polarized liquid-crystal molecules 402. If the material has a single axis of anisotropy or optical axis, (i.e., it is uniaxial) birefringence can be formalized by assigning two different refractive indices to the material for different polarizations. The birefringence magnitude is then defined by $$\Delta n = n_e - n_o$$

where $n_o$ and $n_e$ are the refractive indices for polarizations perpendicular (ordinary) and parallel (extraordinary) to the axis of anisotropy respectively. The higher the birefringence, the greater the exit angle will vary from the incident angle. In one embodiment, fire birefringence is large, i.e., at least 0.2.

The e-rays 700a-n have a polarization direction that is parallel with the drawing page. In other words, the e-ray can be visualized as oscillating back and forth in the plane of the drawing page. The o-ray oscillates through the plane of the page. O-rays are not affected by the cell 400 and, as a result, incident o-rays exit at the same angle as their incident angle. To bend the o-ray the same direction as the e-ray, a second liquid-crystal cell 800 is placed behind or in front of the first liquid-crystal cell 400. The second liquid-crystal cell 800 can be the same material and dimensions as the first liquid-crystal cell 800 or can be different.

Therefore, referring briefly back to FIG. 6, the effective birefringence in cell 400 changes as a function of driving voltage so that:

$$\Delta n_{eff}(V) = (n_o - n(V))$$

Where V is the voltage applied to cell 400. When V approaches its maximum, n(V) approaches $n_o$ and when V is at its minimum, n(V) approaches $n_e$.

For a normal incident input beam, the steered angle is given by;

$$\sin\theta = \frac{\lambda}{L}$$

Where $\lambda = d\Delta n_{eff}$ for 2Π phase retardation, and L is the cell width, and d is the cell thickness. Therefore:

$$\sin\theta(V) = \frac{d(n_e - n(V))}{L}$$

It is now possible to precisely direct the path of a single polarization of light through the cell 400.

Figure 8:
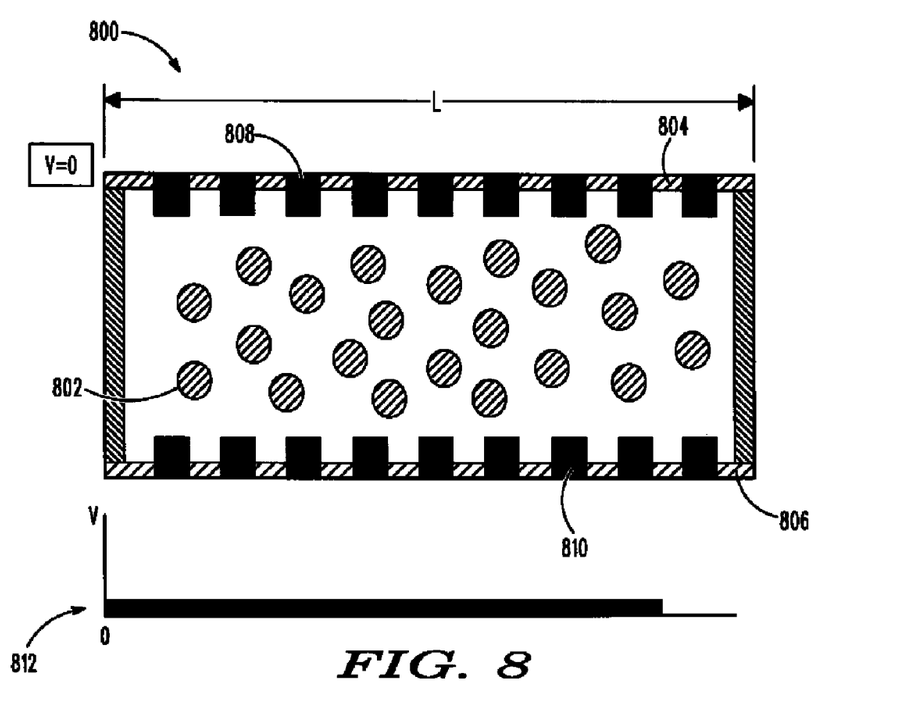
FIG. 8 is cross-section view of a liquid-crystal cell with a plurality of liquid-crystal molecules provided between a first plate and a second plate, where the liquid-crystal molecules in the cell align perpendicular to the plane of the drawing page, according to an exemplary embodiment of the present invention.

FIG. 8 shows a second liquid-crystal cell 800 with a plurality of liquid-crystal molecules 802 provided between a first plate 804 and a second plate 806. The liquid-crystal molecules 802 have a natural alignment, as did liquid-crystal molecules 402, However, the natural alignment of the liquid-crystal molecules 802 is orthogonal to the alignment of the liquid-crystal molecules 402. The liquid-crystal director of the liquid-crystal molecules 802 is shown in FIG. 8 as dots. The axial direction A of the liquid-crystal molecules 802 is perpendicular to a plane of the drawing page.

Each of the plates 804 and 806 has voltage applicators 808 and 810, respectively. The voltage applicators 808 and 810, similar to voltage applicators 408 and 410, represent any measure for applying a voltage gradient 812 to the plates 804 and 806. When a voltage gradient 812 greater than zero is applied, a greater potential is present at a first location between the plates 804 and 806 than at a second location between the plates 804 and 806.

Figure 9:
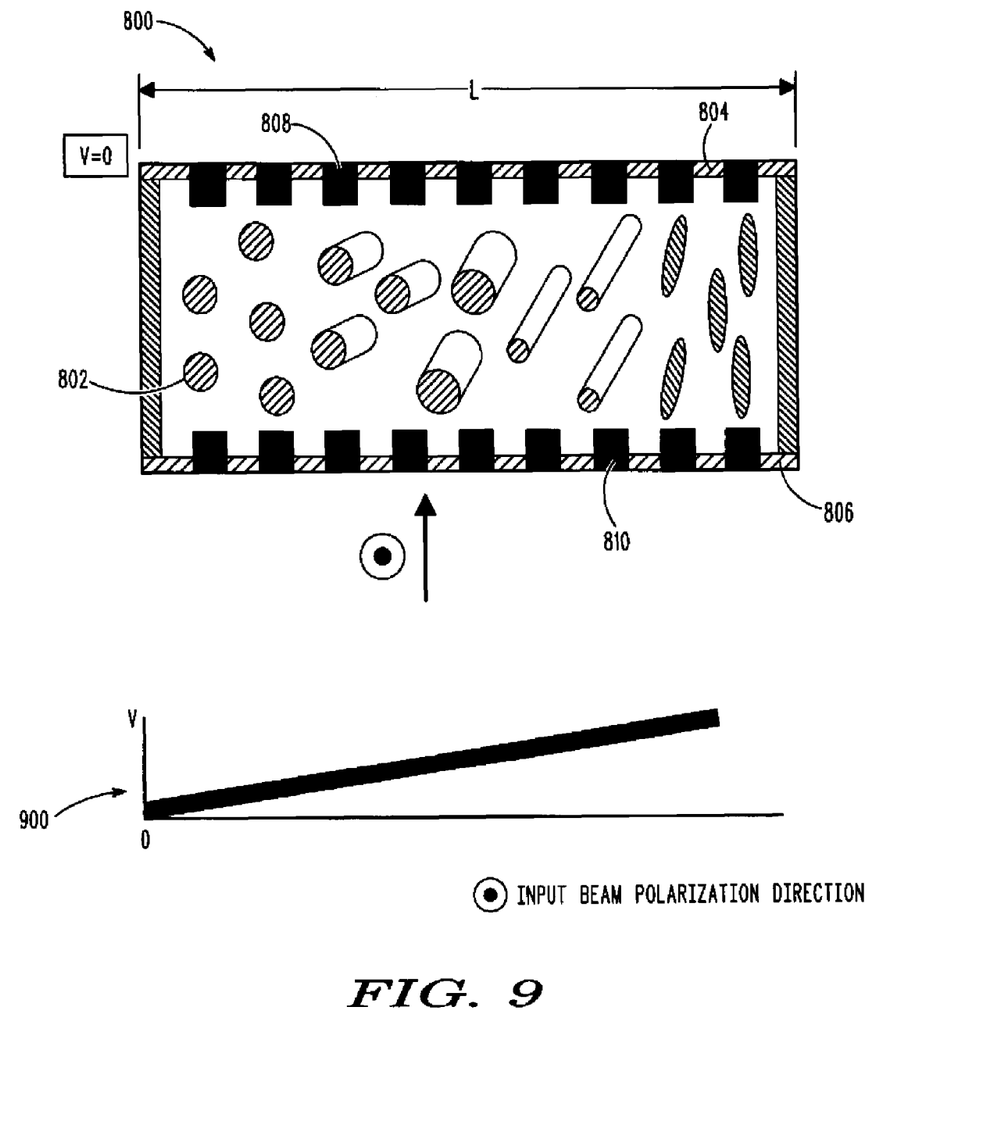
FIG. 9 is cross-section view of the a liquid-crystal cell of FIG. 8 with an applied voltage gradient, according to an exemplary embodiment of the present invention.

FIG. 9 shows a voltage gradient 900 applied to the plates 804 and 806. In response, the liquid-crystal molecules 802 are driven and rotate within the cell. This change in orientation is show in FIG. 9 and corresponds to the increasing voltage levels of the gradient 900. More specifically, at the left side of the cell 800, where the voltage potential is at a minimum, as represented by the graph 900 below the cell, the liquid-crystal molecules 802 remain substantially in their originally aligned positions and axially parallel with the plates 804 and 806. At the right side of the cell 800, where the voltage potential is at a maximum, as represented by the graph 900 below the cell, the liquid-crystal molecules 802 are turned from their original positions to a position substantially perpendicular to the plate surfaces. Between the left and right sides of the cell 800, the liquid-crystal molecules 802 are at varying angles between parallel and perpendicular to the plates 804 and 806, depending on the applied voltage potential within the voltage gradient. Advantageously, the applied voltage gradient 900 on the cell 800 causes an incidental light ray to leave the cell 800 at an angle different from its incident angle.

Figure 10:
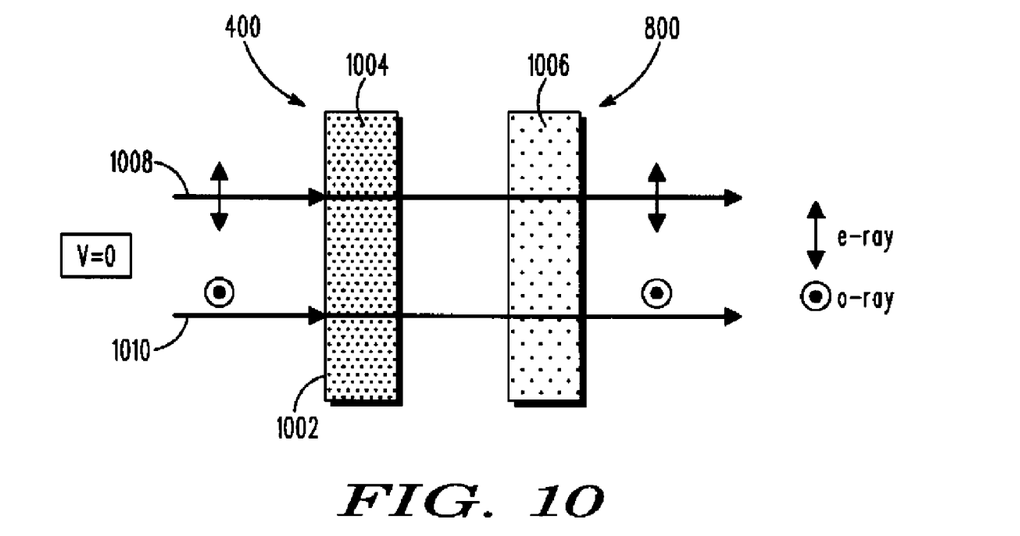
FIG. 10 is a side elevational view of the cell of FIG. 4 lined up with the cell of FIG. 8 in a light communicative configuration, according to an exemplary embodiment of the present invention.
Figure 11:
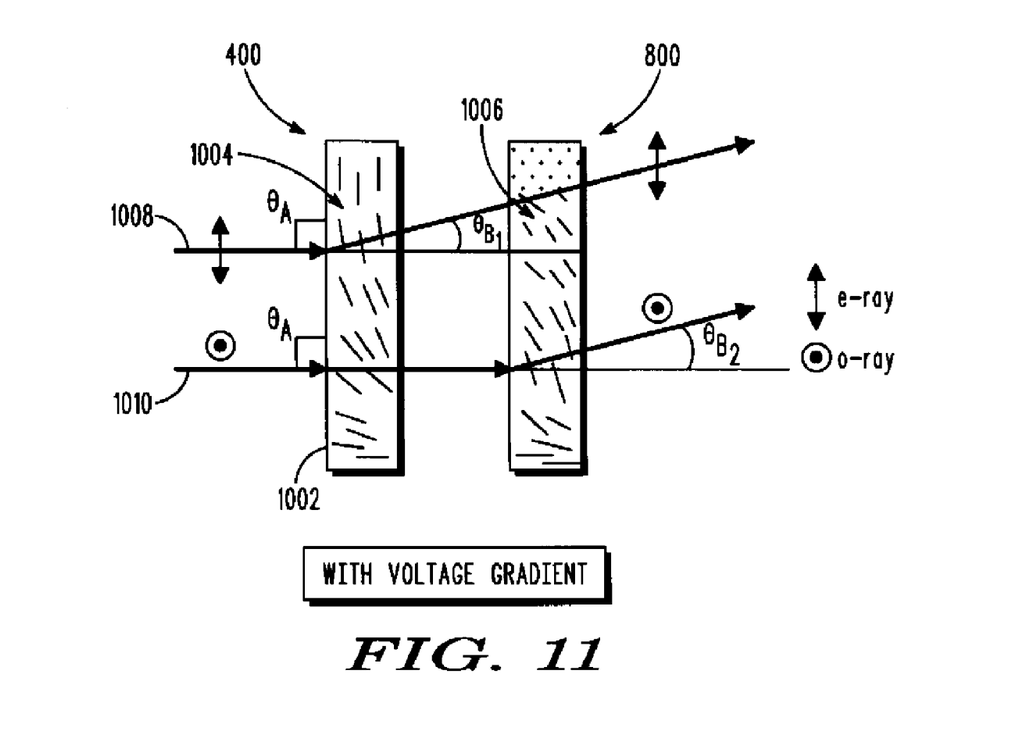
FIG. 11 is a side elevational view of the cells of FIG. 10 aligned in a light communicative configuration showing the effect of a voltage gradient applied thereto, according to an exemplary embodiment of the present invention.
Figure 12:
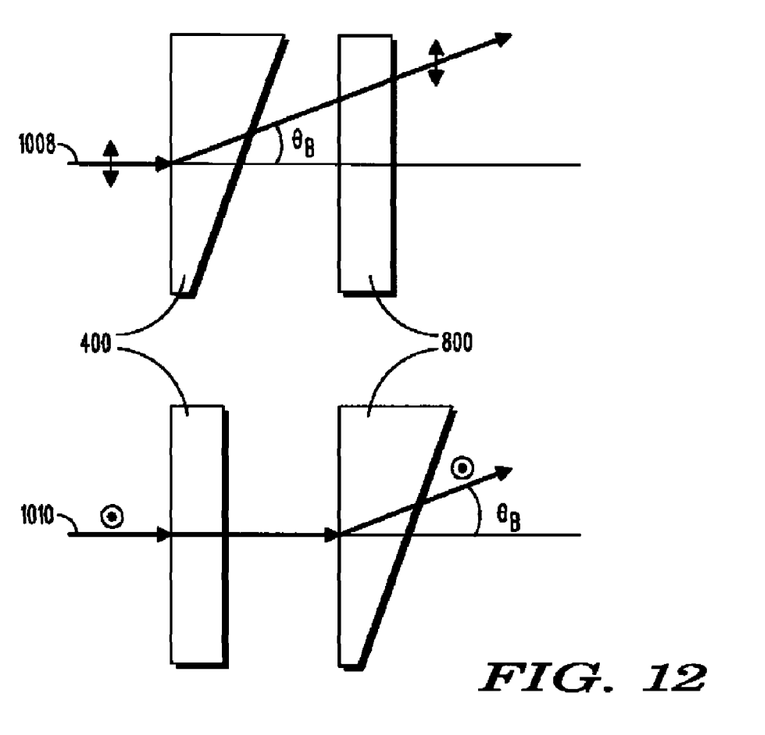
FIG. 12 is a side elevational view of equivalent prism shapes depicting the effect of the voltage gradients on the cells of FIGS. 4 and 8, according to an exemplary embodiment of the present invention.

The cell 800 bends only o-rays that oscillate into and out of the plane of the drawing page, and does not affect the e-rays 700a-n exiting fire first cell 400. FIGS. 10-12 show the effect of cells 400 and 800 when light waves (both e-ray and o-ray) travel through them.

FIG. 10 shows the two cells 400 and 800 lined up in an adjacent configuration, as is envisioned in embodiments of the present invention. A group of liquid-crystal molecules 1004 is shown in cell 400 and a group of liquid-crystal molecules 1006 is shown in cell 800. In their original state, the liquid-crystal molecules 1004 and 1006 are oriented orthogonal to each other and all the liquid-crystal molecules are oriented substantially according to the rubbing direction of the incident and exit plates of their respective cells.

A first light ray 1008 with an e-wave is shown entering the first cell 400 from the left side 1002, passing through, and exiting the cell 400. Because the two cells 400 and 800 are in light communication with one another, the light ray 1008 enters the second cell 800 after it exits the first cell 400. The light ray 1008 then passes through and exits the second cell 800. A second light ray 1010 with an o-wave is shown entering the first cell 400 from the left side 1002, passing through, and exiting the cell 400. As did the first light ray 1008, the second light ray 1010 enters the second cell 800, passes therethrough, and exits the second cell 800.

In FIG. 10, there is no voltage gradient applied to either one of the cells 400 and 800. Therefore, the light rays 1008 and 1010 exit both cells 400 and 800 at substantially the same angle at which they entered the cells.

FIG. 11 shows the above-described affect each of the voltage gradients 600 and 900 has on the cells 400 and 800 and, furthermore, the result of aligning the driven liquid-crystal cells 400 and 800 with one another. Cell 400 is provided with a gradient 600 as shown in FIG. 6. The incident e-ray 1008 enters the cell 400 at an initial angle $\Theta_A$. Because of the voltage gradient 600, the light ray 1008 exits the cell 400 at an angle $\Theta_{B1}$ that is different from the incident angle $\Theta_A$. Again, the exit angle $\Theta_{B1}$ is dictated by the voltage gradient 600.

The o-ray 1010, due to its polarization, passes through the cell 400 unimpeded and unchanged. That is, the incident angle is substantially equal to the exit angle. However, the o-ray continues on and enters fire second cell 800. The second cell 800 has the voltage gradient 900 applied, as shown in FIG. 9 and described above. The voltage gradient 900 causes the incident angle $\Theta_A$ of the light ray 1010 and the exit angle $\Theta_{B2}$ of the light ray 1010 to be different values and, in an embodiment of the present invention, exit angle $\Theta_{B2}$ of the light ray 1010 is the same value as the exit angle $\Theta_{B1}$ of the e light ray 1008 exiting the first cell 400.

FIG. 12 shows equivalent prism shapes to visually depict the effect of the voltage gradients on the cells 400 and 800.

Figure 13:
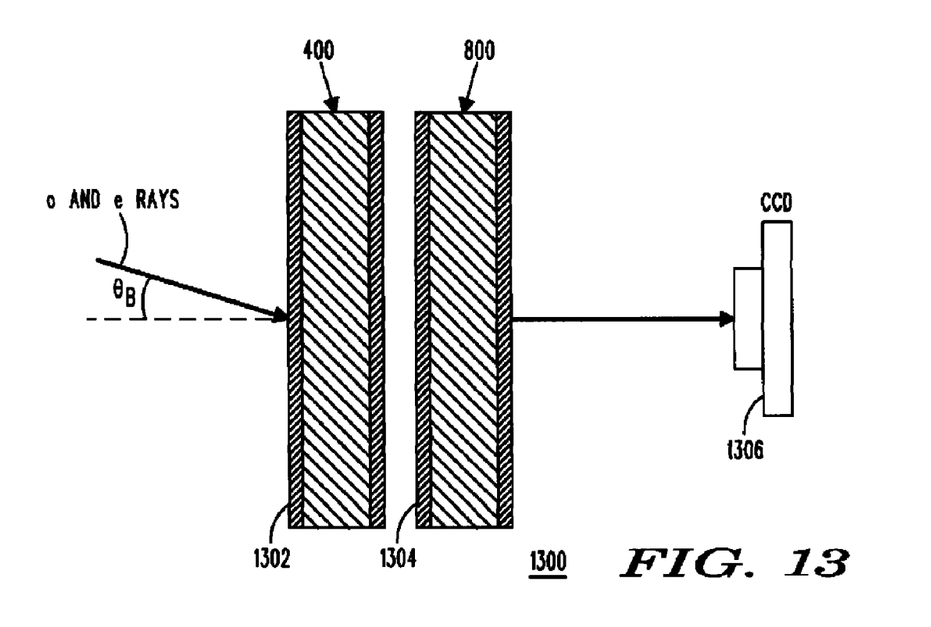
FIG. 13 is a side elevational view showing how the cells of FIGS. 4 and 8 can be used to prevent image blur caused by shaking of an image recording device, according to an exemplary embodiment, of the present invention.

FIG. 13 shows how the liquid-crystal cells 400 and 800 can be used to prevent image blur caused by shaking of the image recording device. In FIG. 13, the two liquid-crystal cells 400 and 800 are adjacent one another and in light communication with one another so that light passing through the surfaces of the first liquid-crystal cell 400 also passes through the surfaces of the second liquid-crystal cell 800. In this configuration 1300, the light incident direction, entering the surfaces of the cells, is opposite to that shown and described above. Specifically, in the above figures, the incident light rays o and e-rays have been shown as perpendicular to the cell walls and the light exiting the cells 400 and 800 has been shown and described as being at angles that vary depending on the voltage gradient applied. However, in operation, as shown in FIG. 13, the voltage gradients will be applied and adjusted in value so that a light ray incident on a first surface 1302 of the first cell 400 or a first surface 1304 of the second cell 800, depending on the polarity of the ray, is compensated so that it exits the second surface of the appropriate cell at an angle substantially perpendicular to that cell and can be delivered directly to an image detector 1306, such as a charge-coupled device (CCD), an electronic light sensor used in digital cameras. In this way, a tilt of the image-capturing device 1300 can be compensated for, making it appear to the image detector 1306 as though the subject remains in the same location.

Figure 14:
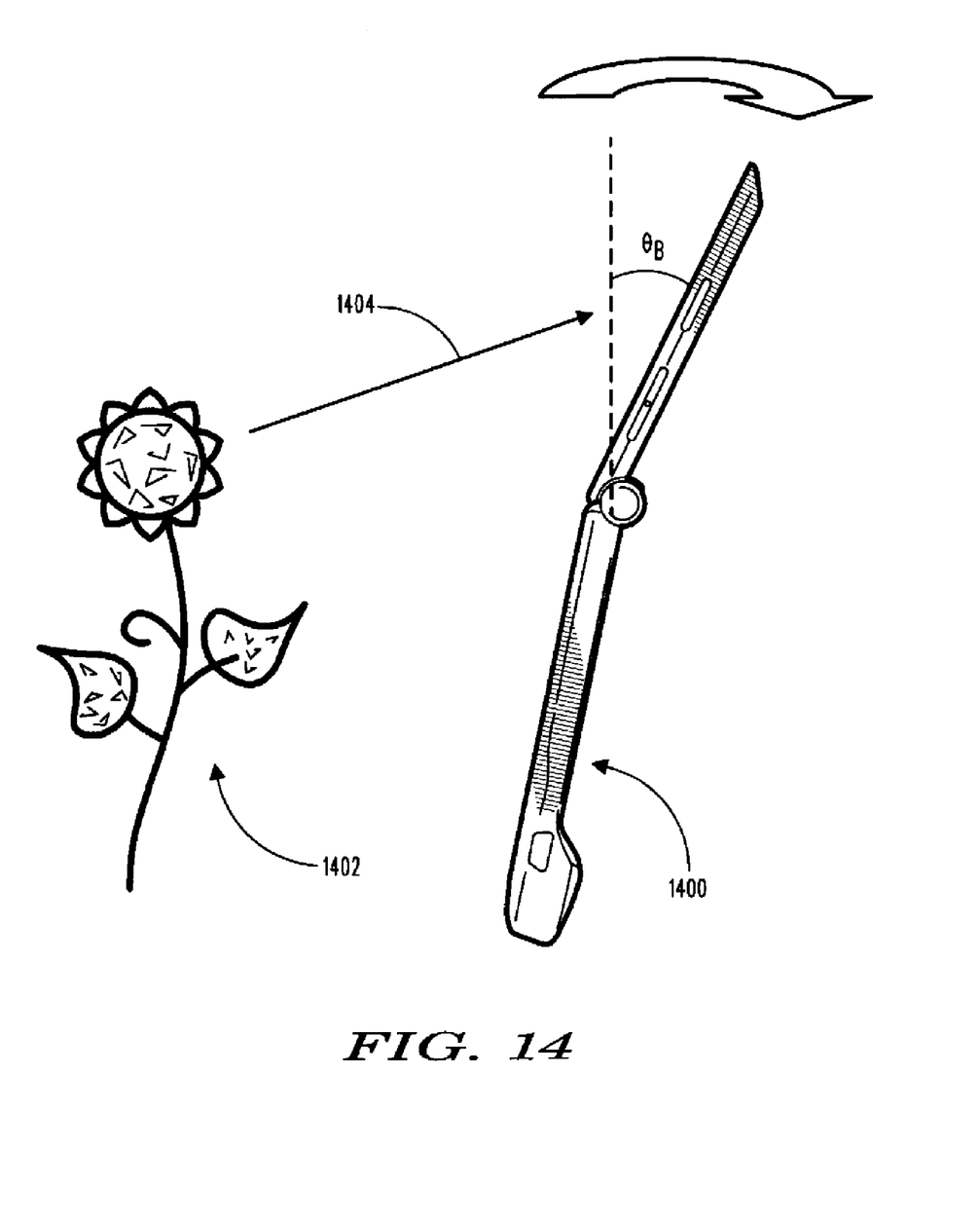
FIG. 14 is a perspective view showing a cellular telephone with an embedded image-capturing device and a subject, according to an exemplary embodiment of the present invention.

For example, FIG. 14 shows a cellular telephone 1400 with an embedded image-capturing device (not shown). Previously, when taking a picture of a subject 1402, if the phone 1400 moves an angle $\Theta_B$, the local point of the phone 1400 would drag from the subject 1402 to a spot above the subject, thereby creating a blurred effect. With the present invention, the movement of the camera 1400 can be detected and the cells 400 and 800 can be adjusted so that a direct optical path 1404 from the subject 1402 to the camera 1400 is received at the input to the liquid-crystal cells at the angle $\Theta_B$, but advantageously output from the cells 400 and 800 orthogonal to the output planes of the cells 400 and 800 as shown in FIG. 13.

It is noted that the embodiments thus-far described and shown in the figures describe both cells 400, 800 being in a single liquid-crystal mode, which is Electrically Controlled Birefringence (ECB) mode. However, there are several other liquid-crystal modes that can achieve same result, which is using a gradient voltage(s) to compensate for camera movement. For example, a vertical alignment (VA) mode, is a reverse ease of ECB. In this mode, the liquid-crystal molecules stay vertically (perpendicular to plates) during the OFF state, and rotate to parallel to glass when the cell is in the ON state. This is contrasted to the ECB mode, where the liquid-crystal molecules align parallel to the plate in the OFF state. In one embodiment of the present invention, the cells are not of the same type, i.e., one of the two cells is in the ECB mode and the other cell is in the VA mode.

Figure 15:
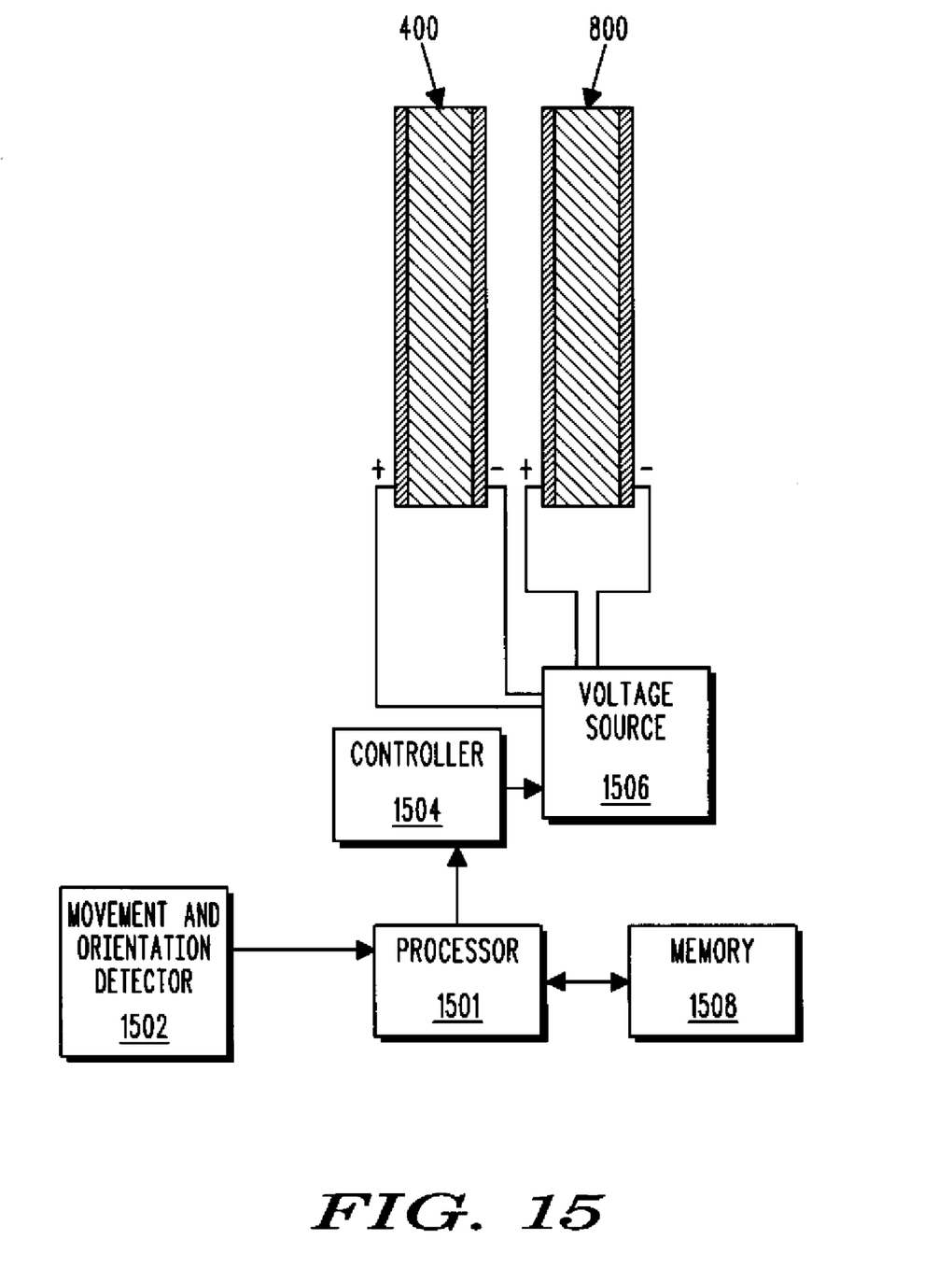
FIG. 15 is a block circuit diagram of a system for controlling the voltage gradients applied to the cells of FIGS. 4 and 8, according to an exemplary embodiment of the present invention.

FIG. 15 shows an exemplary circuit 1500 for controlling the voltage gradients applied to the cells 400 and 800. The circuit 1500 includes a movement and orientation detector 1502 that is used to recognize a movement/an orientation of the image-capturing device 1300. Movement detection mechanisms and techniques are well-known in the art. Several examples of these include gyroscopes, velocity sensors, orientation sensors, levels, and many others. Any of these sensing mechanism or techniques can be used as the movement/orientation detector 1502.

The detector 1502 is communicatively coupled to a processor 1501. The processor 1501 is coupled to a controller 1504, which is coupled to a voltage source 1506 and is able to apply voltage from the power source 1506 to a corresponding one of the cells 400 and 800. In other embodiments, multiple controllers and or voltage sources are used to apply voltages to the cells.

The processor 1501 can be any suitably configured processing system adapted to implement an exemplary embodiment of the present invention. The processor 1501 is coupled to a memory 1508. The memory 1508 is useful for, for example, storing correction values for responding to detected movements of the image-capturing device 1400. Computer programs (also called computer control logic) can be stored in the memory 1508. Such computer programs, when executed, enable the processor 1501 to perform the features of the present invention as discussed herein. An implementation of the invention can be entirely done within the hardware of FIG. 15 or a combination of hardware and software.

Figure 16:
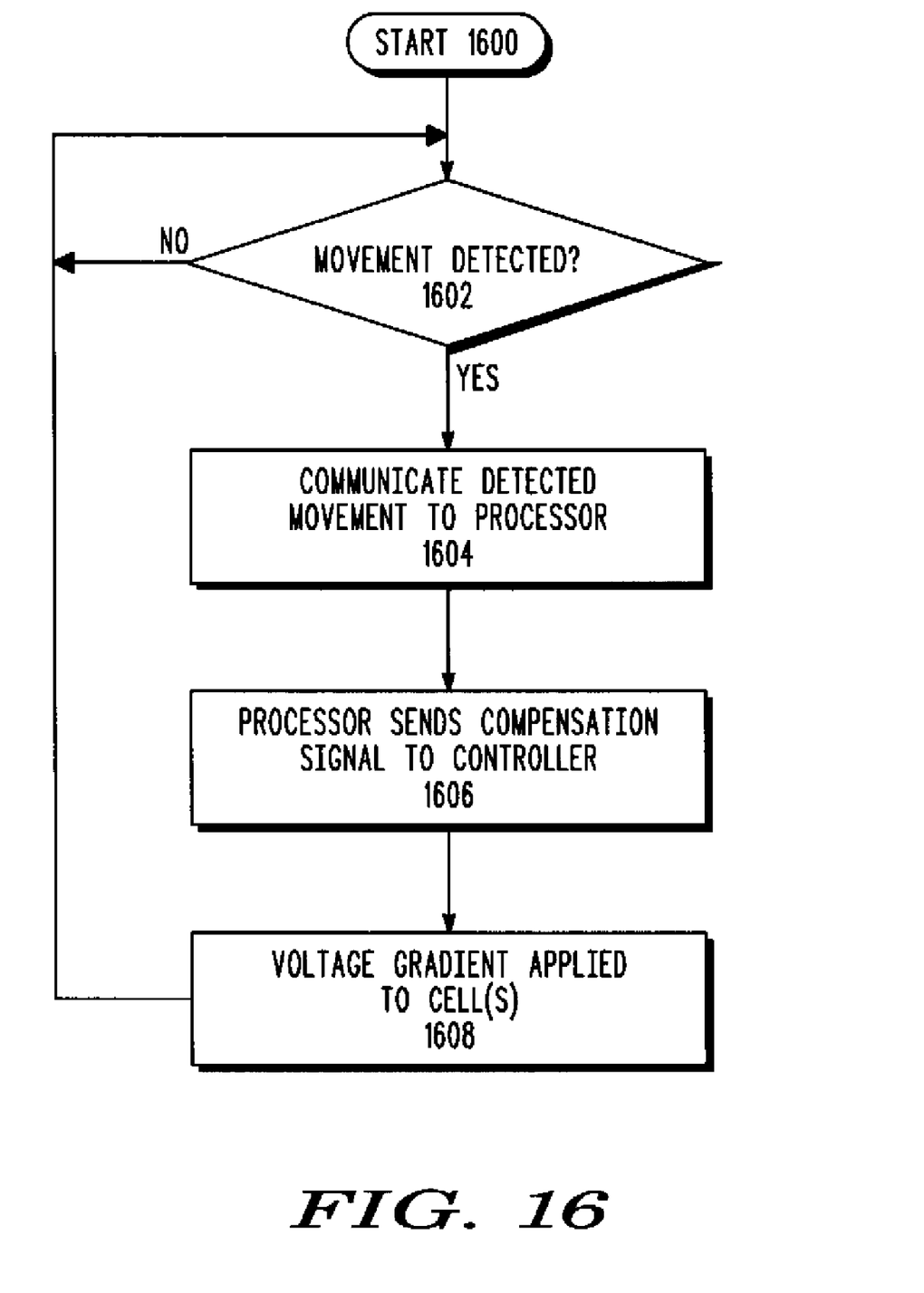
FIG. 16 is a process flow chart showing an exemplary process for detecting movement and orientation of a device and applying a corresponding voltage gradient to the corresponding liquid-crystal cells, according to an exemplary embodiment of the present invention.

FIG. 16 shows a process flow chart of an embodiment of the present invention. The flow begins at step 1600 and moves directly to step 1602 where a movement is detected by the detector 1502. The detected movement and direction of movement is communicated to the processor 1501 in step 1604. The processor 1501 calculates an opposing angle $\Theta_B$ that will offset the detected movement. In step 1606, the processor 1501 sends a signal to the controller 1504 which, in step 1608, sends a signal to the voltage source 1506 to apply an appropriate voltage gradient to one or both cells 400, 800. This gradient(s) causes the incident angle to vary from the exit angle. The flow moves back up to step 1602 and waits for another detected movement.

Figure 17:
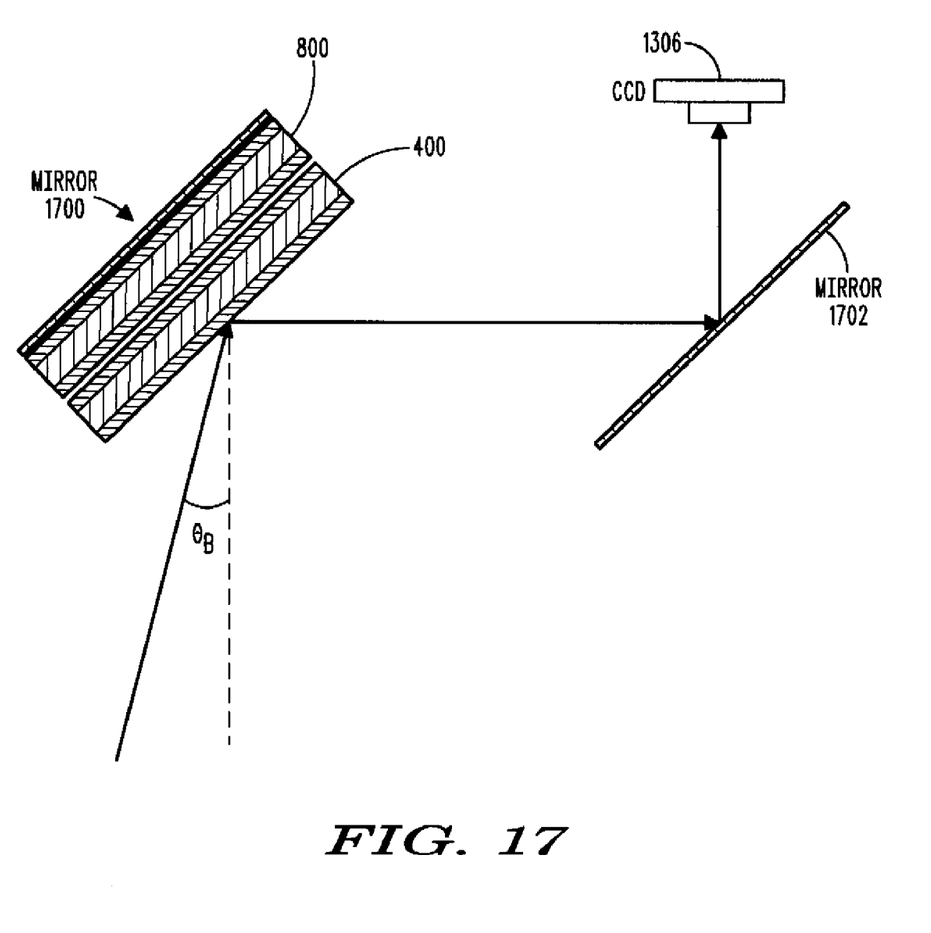
FIG. 17 is a side elevational view of a configuration for reducing a thickness of the cells of the embodiment of FIG. 13, according to an exemplary embodiment of the present invention.

FIG. 17 shows an embodiment of the present invention where the thickness d of the cells 400 and 800 can be reduced by 50%. In this embodiment, a mirror 1700 is placed behind the cells 400 and 800 so that light entering the cells 400 and 800 undergoes refraction as it passes through each cell thickness of ½d. The light rays reflect off the mirror 1700 and pass through the cell thickness of ½d.

If this configuration is placed on the side of a camera, a second mirror 1702 can be positioned near the image detector 1306 and reflect the image directly into the image detector 1306.

CONCLUSION

As should now be clear, embodiments of the present invention provide a voltage controlled liquid-crystal cell that receives light at an incident angle and refracts light at a precisely-defined exit angle.

Although liquid-crystal cells have been described above, the present invention can be implemented using other materials whose refractive indices are electrically tunable.

In still other embodiments, a polarizer can be used in conjunction with a liquid-crystal cell to compensate for detected camera movement. However, due to the nature of the polarizer, light throughput is reduced by half.

In yet another embodiment, an x-y addressable structure can be used to actually bend the light rays, not only in up and down directions, but also in the left-right directions.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "about" or "approximately," as used herein, applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

What is claimed is:

1. A camera-movement compensation device comprising:
   a first liquid-crystal cell having a pair of parallel transparent plates;
   a first voltage source coupled to the first liquid-crystal cell and able to apply and alter a first voltage gradient across the plates of the first liquid-crystal cell;
   a second liquid-crystal cell having a pair of parallel transparent plates and disposed so that each of the plates of the second liquid-crystal cell is parallel to the plates of the first liquid-crystal cell and in light communication with at least one wave of light passing through the plates of the first liquid-crystal cell and a rubbing direction of the pair of transparent plates of the first liquid-crystal cell is orthogonal to a rubbing direction of the pair of transparent plates of the second liquid-crystal cell;
   a second voltage source coupled to the second liquid-crystal cell and able to apply and alter a second voltage gradient across the surfaces of the second liquid-crystal cell; and
   a movement and orientation detector communicatively coupled to the first and second voltage sources,
   wherein the first voltage source alters a slope of the first voltage gradient in proportion to a movement sensed by the detector and the second voltage source alters a slope of the second voltage gradient in proportion to a movement sensed by the detector.

2. The compensation device according to claim 1, wherein:
   the first voltage source has a low-voltage state; and
   the second voltage source has a low-voltage state, and when the first voltage source is in the low-voltage state, a liquid crystal director of the first liquid-crystal cell is one of parallel and perpendicular to the plates of the first liquid crystal cell and when the second voltage source is in the low-voltage state, a liquid crystal director of the second liquid-crystal cell is one of parallel and perpendicular to the plates of the second liquid crystal cell.

3. The compensation device according to claim 2, wherein:
   when the liquid-crystal director of the second liquid-crystal cell is the same as the liquid-crystal director of the first liquid-crystal cell, the first voltage gradient is parallel to the second voltage gradient.

4. The compensation device according to claim 2, wherein:
   when the liquid-crystal director of the second liquid-crystal cell is the same as the liquid-crystal director of first liquid-crystal cell, the slope of the first voltage gradient and the slope of the second voltage gradient are constants such that a resulting variation in a refractive index across each of the liquid-crystal cells is linear.

5. The compensation device according to claim 1, further comprising:
   an image detector; and
   a lens disposed between the image detector and the first liquid-crystal cell.

6. The compensation device according to claim 1, further comprising:
   a lens; and
   an image detector,
   wherein the first and second liquid-crystal cells are disposed between the lens and the image detector.

7. The compensation device according to claim 1, wherein:
   at least a portion of at least one of the first voltage gradient and the second voltage gradient is a produced by an indium tin oxide trace.

8. A camera-movement compensation device comprising:
   a first liquid-crystal cell having a pair of parallel transparent plates;
   a first voltage source coupled to the first liquid-crystal cell and able to apply and alter a first voltage gradient across the plates of the first liquid-crystal cell;
   a second liquid-crystal cell having a pair of parallel transparent plates and disposed so that each of the plates of the second liquid-crystal cell is parallel to the plates of the first liquid-crystal cell and in light communication with at least one wave of light passing through the plates of the first liquid-crystal cell;
   a second voltage source coupled to the second liquid-crystal cell and able to apply and alter a second voltage gradient across the surfaces of the second liquid-crystal cell;
   a first mirror parallel with and adjacent to the first and second liquid-crystal cells for reflecting light rays passing through the first and second liquid-crystal cells into the first and second liquid-crystal cells; and
   a movement and orientation detector communicatively coupled to the first and second voltage sources,
   wherein the first voltage source alters a slope of the first voltage gradient in proportion to a movement sensed by the detector and the second voltage source alters a slope of the second voltage gradient in proportion to a movement sensed by the detector.

9. A method for compensating for a camera movement, the method comprising:
   providing a first liquid-crystal cell that includes a first plurality of liquid-crystal molecules sandwiched between a first pair of parallel transparent plates;
   providing a second liquid-crystal cell that includes a second plurality of liquid-crystal molecules sandwiched between a second pair of parallel transparent plates;

aligning the first liquid-crystal cell with the second liquid-crystal cell so that each of the plates of the second liquid-crystal cell is parallel to the plates of the first liquid-crystal cell and in light communication with at least one wave of light passing through the plates of the first liquid-crystal cell and a rubbing direction of the first pair of parallel transparent plates of the first-liquid crystal cell is orthogonal to a rubbing direction of the second pair of parallel transparent plates of the second liquid-crystal cell;

detecting a movement of a camera; and compensating for the detected movement by applying at least one of:
- a first voltage gradient to the first liquid-crystal cell; and
- a second voltage gradient to the second liquid-crystal cell, where a slope of the applied gradient is in proportion to the detected movement.

10. The method according to claim 9, wherein:
the applying the at least one voltage gradient changes an orientation of a liquid-crystal director of at least one of the first and second one of the liquid-crystal cell with respect to the other of the first and second liquid-crystal cells dependent upon the detected movement.

11. The method according to claim 9, wherein:
the applying the at least one voltage gradient changes at least one of the first and second plurality of liquid-crystal molecules from an initial state where a liquid-crystal director of the at least one of the first and second one of the liquid-crystal cells is one of parallel and perpendicular to the plates of the at least one of the first and second liquid-crystal cells.

12. The method according to claim 11, wherein:
when the liquid-crystal director of the second liquid-crystal cell is the same as the liquid-crystal director of the first liquid-crystal cell, the first voltage gradient is parallel to the second voltage gradient.

13. The compensation device according to claim 11, wherein:
when the liquid-crystal director of the second liquid-crystal cell is the same as the liquid-crystal director of first liquid-crystal cell, the slope of the first voltage gradient and the slope of the second voltage gradient are constants such that a resulting variation in a refractive index across each of the liquid-crystal cells is linear.

14. The method according to claim 9, wherein:
the second liquid-crystal cell is in light communication with at least one wave of light passing through the plates of the first liquid-crystal cell.

* * * * *